United States Patent [19]

Quittkat

[11] 4,248,639

[45] Feb. 3, 1981

[54] METHOD OF CALCINING SINTERABLE MATERIALS TO FORM CEMENT CLINKER OR THE LIKE

[75] Inventor: Wolfram G. Quittkat, Gauting, Fed. Rep. of Germany

[73] Assignee: Babcock Krauss-Maffei Industrieanlagen GmbH, Munich, Fed. Rep. of Germany

[21] Appl. No.: 2,742

[22] Filed: Jan. 11, 1979

[30] Foreign Application Priority Data

Jan. 12, 1978 [DE] Fed. Rep. of Germany ....... 2801161

[51] Int. Cl.³ .............................................. C04B 7/36
[52] U.S. Cl. .................................. 106/100; 422/189; 422/214; 432/14; 432/18; 432/58; 432/106
[58] Field of Search ................ 106/100, 103; 423/168, 423/175, 177, 637; 432/14, 15, 18

[56] References Cited

U.S. PATENT DOCUMENTS

| | | | |
|---|---|---|---|
| 3,873,331 | 3/1975 | Kondo et al. | 106/100 |
| 3,895,955 | 7/1975 | Kondo et al. | 106/100 |
| 3,955,995 | 5/1976 | Touborg | 106/100 |

Primary Examiner—O. R. Vertiz
Assistant Examiner—Wayne A. Langel
Attorney, Agent, or Firm—Karl F. Ross

[57] ABSTRACT

Carbonate-containing sinterable material, e.g. for cement clinker, is calcined in a rotary kiln and then cooled in a grate cooler. The material is subjected to preheating in a suspension preheater and then to precalcination in an upright precalcining installation. The fuel for the latter is introduced through nozzles into a substantially oxygen-free crude power exhaust gas suspension and after turbulent mixing of the fuel with this suspension a stoichiometric quantity of combustion air is introduced so that a flameless combustion occurs in the turbulent mixture. Thereafter the solids enter the rotary kiln for the final calcination.

5 Claims, 4 Drawing Figures

METHOD OF CALCINING SINTERABLE MATERIALS TO FORM CEMENT CLINKER OR THE LIKE

FIELD OF THE INVENTION

The present invention relates to the burning of sinterable material containing carbonate and, more particularly, to the calcination of cement clinker.

BACKGROUND OF THE INVENTION

Carbonate-containing raw materials for the production of calcined or sintered products, especially cement clinker, are subjected to calcination or firing in a rotary kiln, downstream of which can be provided a cooler for the sintered clinker and upstream of which there can be disposed a suspension heat exchanger for a preheating and/or precalcination of the crude solid (powder) before it is introduced into the rotary furnace.

The major portion of the fuel used in the system can be provided for the precalcination and preheating operations since a substantial portion of the deacidification, i.e. removal of carbon dioxide from the carbonates, can be effected in the precalcination stage. The combustion air required in the precalcination stage may be obtained in part from the air heated in the cooler, i.e. the air used for cooling the cement clinker in a grate-type or like cooling unit downstream of the rotary kiln.

In the upstream suspension gas preheater, the solid (powder) to be charged into the rotary kiln is subjected to preheating by intimate contact with waste gases from the rotary kiln. The fuel supplied to the preheating and precalcination stages serves to effect the additional heating necessary for deacidification which is practically complete as the solids leave the precalcination stage, thereby improving the throughput of the rotary kiln.

Because of the endothermic deacidification of the calcium carbonate in the precalcination and suspension preheater upstream of the rotary kiln, in which heat exchange takes place between the solid particles and the suspending gas with a higher heat transfer efficiency than can be maintained in the rotary furnace, it is possible to increase the throughput of a rotary furnace from four to five times above that which would obtain in the absence of such precalcination and deacidification upstream of the rotary kiln. This is discussed in German patent document (Published Application or Auslegeschrift) DE-AS 22 62 213.

It is considered important in this system to heat the hot gases used in heat exchange in the suspension gas preheater by supplying fuel to cooler-heated air and effect a combustion of the fuel with an oxygen-containing gas which has thus been relatively enriched thermally by preheating. Reference is made, in this connection, to German patent document (Open Application or Offenlegungsschrift) DE-AS 2 361 066 and German patent document (Published Application-Auslegeschrift) DE-AS 2 356 740.

The principle of repetitively reheating the carrier gas and the use of the cooling air is described in TONINDUSTRIE ZEITUNG, 1965, No. 15/16, pages 351–365.

The significance of the sequence, nature and manner in which the additional fuel and the combustion air for the burning thereof are supplied to the precalcination system is clear from the above mentioned references and the references discussed below. The parameters and conditions differ in each case and there are many theories as to why any particular treatment of the problem should be considered the correct one. In general, however, it can be said that the various solutions known to date or proposed to date are contradictory or mutually exclusive or mutually inconsistent.

In German patent document (Open Application-Offenlegungsschrift) DE-AS 2 361 006 it is proposed to use a portion of the fuel to heat the prewarmed gas (air) from the cooler and then to mix it with the furnace exhaust gas and, in a mixing chamber in which the raw powder is circulated, to introduce the remainder of the fuel through a burner to effect the main heating.

In German patent document (Printed Application-Auslegeschrift) DE-AS 2 247 172 it is proposed to burn the fuel in a separate combustion chamber to which the cooler air is supplied while the crude powder is circulated between this combustion chamber and the lowest cyclone stage of the suspension gas preheater.

In both cases it is found that the concentrated introduction of fuel leads to local overheating in the oxygen-rich suspension of the powdered material in the furnace exhaust gas because, on the one hand, of the injection of the fuel in the manner described and, on the other hand, because combustion air is mixed with the suspension before the fuel is introduced.

The result of such local overheating is the fusion of some of the particles into larger bodies, the melting of particles into droplets, the plugging of portions of the flow cross section, the undesired deposition of materials from the solids and, in general, thermally inefficient operation.

That this problem has been recognized in the art is clear from German patent document (Open Application-Offenlegungsschrift DE-AS 2 307 027) in which it is proposed to provide an intimate mixture of fuel and the crude or raw powder before this mixture is blown into the oxygen-containing hot gas.

While the latter publication does not describe how to obtain a uniform distribution of the comparatively small quantity of fuel on the relatively large quantity of solids, efforts to bring about the mixture of a liquid fuel which amounts to 3% to 4% by weight of the solids, with the raw meal of high temperature (500° C.) resulted in nonuniform distribution even when energy-consuming blending at high apparatus cost was adopted. In fact, attempts to follow the teaching of the last-mentioned publication also resulted in local concentrations and hence the localized over-heating and melting or fusion characteristics and the baking of solids onto surfaces of the precalcination stage so that plugging occurs.

OBJECTS OF THE INVENTION

It is the principal object of the present invention to provide an improved method of producing a sintered product, especially sintered clinker, from a raw powder containing carbonates, whereby the disadvantages of the earlier systems are avoided.

Another object of this invention is to provide, in a method of firing carbonate-containing solids, an improved precalcination of the solids up to the highest possible degree of decarbonisation so that localized overheating and fusion phenomena do not occur, baking of solids onto surfaces is minimized and the danger that the flow cross section at the upstream end of the rotary kiln will be plugged is reduced.

It is also an object of the invention, in an improved method of the latter type, to bring about a uniform distribution of fuel and thereby prevent local overheating.

SUMMARY OF THE INVENTION

These objects are attained, in accordance with the present invention, by an approach in which the fuel particles, e.g. oil, are deposited upon the solid particles of the particulate material in the exhaust gas suspension prior to contact of the latter with any oxygen, the exhaust gas being practically devoid of free oxygen capable of initiating combustion where the fuel is introduced.

More specifically, the invention comprises a method of firing clinker, especially cement clinker, from carbonate-containing raw materials in the form of a powder using a rotary kiln or furnace with a grate-type cooler at the downstream end and a suspension gas preheater at the upstream end and in which a heat exchange is effected in a suspension of the particulate material to be supplied to the rotary kiln and the hot exhaust gases from the latter, at least part of the heat which is transferred to the particles being supplied in the form of heated cooling air from the downstream cooler.

According to this invention, the fuel is introduced through a multiplicity of nozzles into the substantially oxygen-free suspension of the particulate in the furnace exhaust gas and, after turbulent mixing with this suspension so that the fuel is uniformly dispersed in the gas and deposited uniformly on the solid particles, the suspension is contacted with a precise stoichiometric amount of combustion air in such manner and with such turbulence that a flameless oxidation occurs.

Advantageously, this is effected in a precalcination stage disposed in an upright stack between the rotary kiln and the lower cyclone constituting part of the suspension preheater.

Since the oxidation is effected with no visible flame and in a flameless manner, flame radiation heat is excluded so that localized overheating and sintering which has resulted in the past from radiation from such a flame is likewise precluded. Since the flameless combustion takes place on the surfaces of the particles upon which the fuel has practically uniformly been deposited, the heat liberated by such combustion directly effects the endothermic deacidification of the calcium carbonate particles without any critical temperature increase.

As more than half of the total fuel required for the process is utilized for the complete deacidification of the raw powder in the formation of cement clinker and also the greatest portion of the heat value of the fuel is required to preheat the powder in the precalcinator and the suspension preheating stage, it is advantageous to carry out the deacidification to the maximum possible extent in the oxidation zone of the precalcinator. This gives a high thermal cross-sectional loading for the oxidation zone which, according to a further feature of the invention, may be subdivided into a plurality of stages into each of which the fuel and combustion air are supplied at successive stages each being designed for substantially complete consumption of the free oxygen introduced with the combustion air thereto.

Reference has been made herein to "substantially oxygen free" and to "substantially all of the free oxygen", and to like expressions. It should be observed that, at the time the fuel is introduced into the turbulent particles (waste gas mixture), the mixture should be free as possible, preferably totally free, from oxygen in the form $O_2$. This applies when the system utilizes a single stage or for each of the stages of a multistage system.

It has been found that the subdivision of the system into stages with the fuel and the requisite stoichiometric quantity of oxygen being introduced into each stage of a plurality of stages, reduces the specific thermal loading and greatly facilitates control of the reaction and improved thermal efficiency.

Furthermore, when the system is controlled in response to the temperature measurement at the end of all or each oxidation zone, the equilibrium between the heat liberated (as a result of the fuel/air proportion) and the heat bound (by deacidification) can be controlled readily. The controlled parameter is most advantageously the fuel feed rate. When perturbations are introduced into the system, therefore, the fuel rate can be adjusted accordingly.

It may be mentioned that to realize the invention, the combustion air is the hot air derived from the cooler and drawn through a separate tube from the cooler to the precalciner.

The process of the present invention has the advantage and is distinguished from the known processes in that it effects a complete deacidification during the preheating stages and prior to introduction of the solids into the rotary kiln or furnace.

The maximum throughput for a given furnace structure can thus better be warranted because no decrease of throughput will be caused by a less efficient deacidification or preheating as it may occur in other preheater systems.

Capital costs per unit throughput can be reduced and product capacity for a given investment increased. The improvement over conventional precalcination systems is, of course, that the precalcination can be effected without the danger of thermal overloading or nonuniform temperature distribution, i.e., without premature sintering, plugging of the flow cross sections or baking of solids onto surfaces.

Advantageously, the system of the present invention enables the use of atomizing nozzles for dispersing the fuel instead of burners as hitherto has been thought to be necessary, especially in systems in which combustion in the gas stream was effected before the solids were introduced into the suspension or concurrently therewith and even subsequently thereto. Not only are the atomizing nozzles much less expensive than complex burners, but they do not need the various accessories which are associated with burners and do not have the disadvantages of having to be provided in a firing chamber or the like. The atomizing nozzles can be simply mounted in the lining of the precalcinator wall and a relatively large number of such atomizing nozzles can be used at a minimum cost. This ensures a uniform distribution of the fuel.

BRIEF DESCRIPTION OF THE DRAWING

The above and other objects, features and advantages of the present invention will become more readily apparent from the following description, reference being made to the accompanying drawing in which:

FIG. 3 illustrates more particular detail of FIG. 2.

SPECIFIC DESCRIPTION AND EXAMPLES

Figure 1:
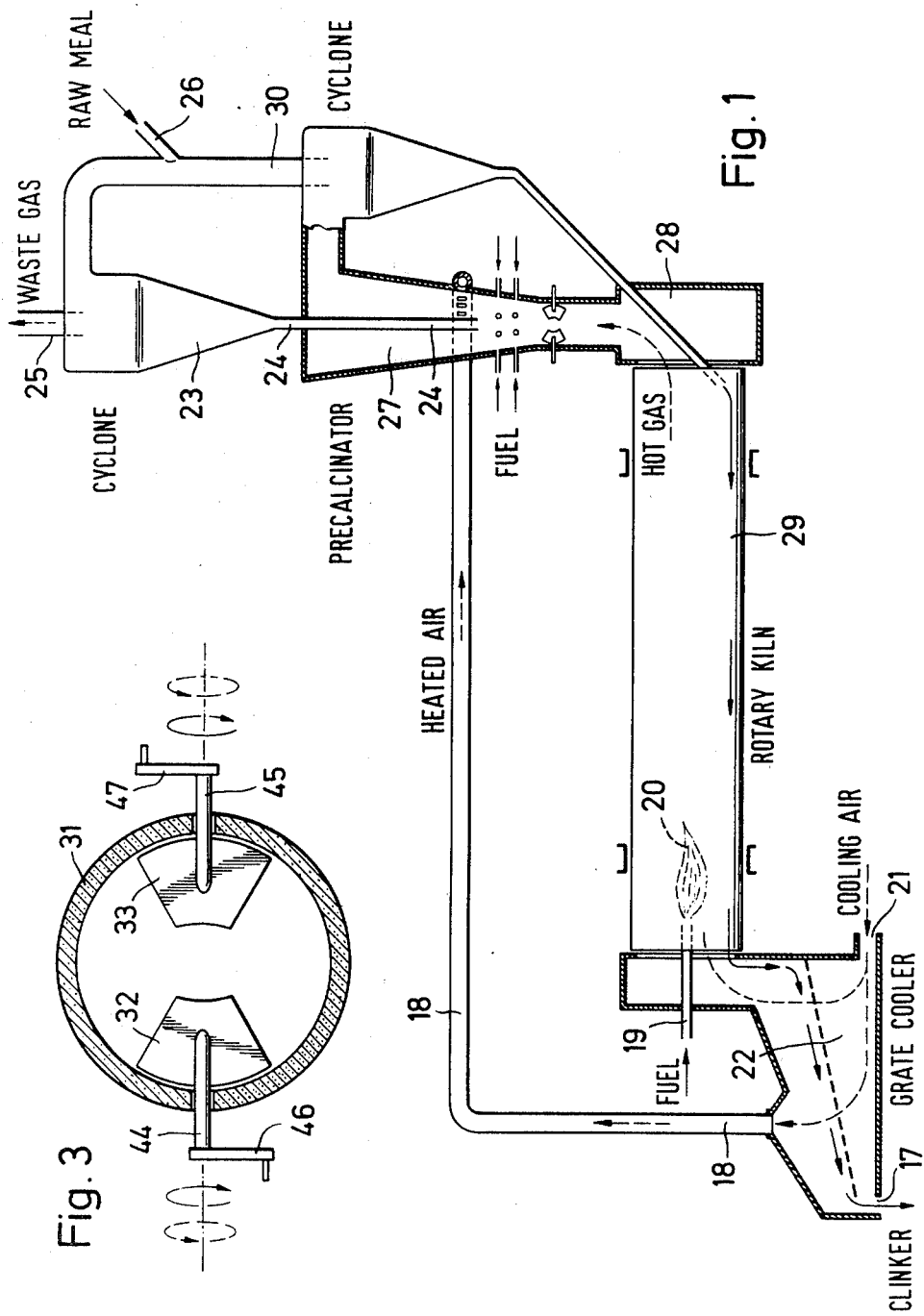
FIG. 1 is a view of an assembly for producing cement clinker in accordance with the invention.

Referring to FIG. 1 of the drawing, which provides an over-view of an apparatus for producing cement clinker from sinterable powdered raw meal which can be mixed by any conventional means (not shown), the powdered raw meal will be added at 26 to an ascending tube 30 leading to a cyclone 23 and comprising a stream of gas. From the cyclone 23 the gas is discharged at 25 while solids are fed through a conduit 24 to a precalcinator 27 which is described more particular to FIG. 2.

A rotary kiln is shown at 29 with an inlet head at 28 and a grate cooler at 22. Cooling air is introduced at 21 and in part passes as combustion air of a burning flame 20 to the rotary kiln 29 to which fuel is fed at 19 to provide the hot gases which carry out the calcining in the rotary kiln 29. The other part of the cooling air is fed through a tube 18 to the precalcinator 27. The clinker is discharged through a chute 17.

Figure 2:
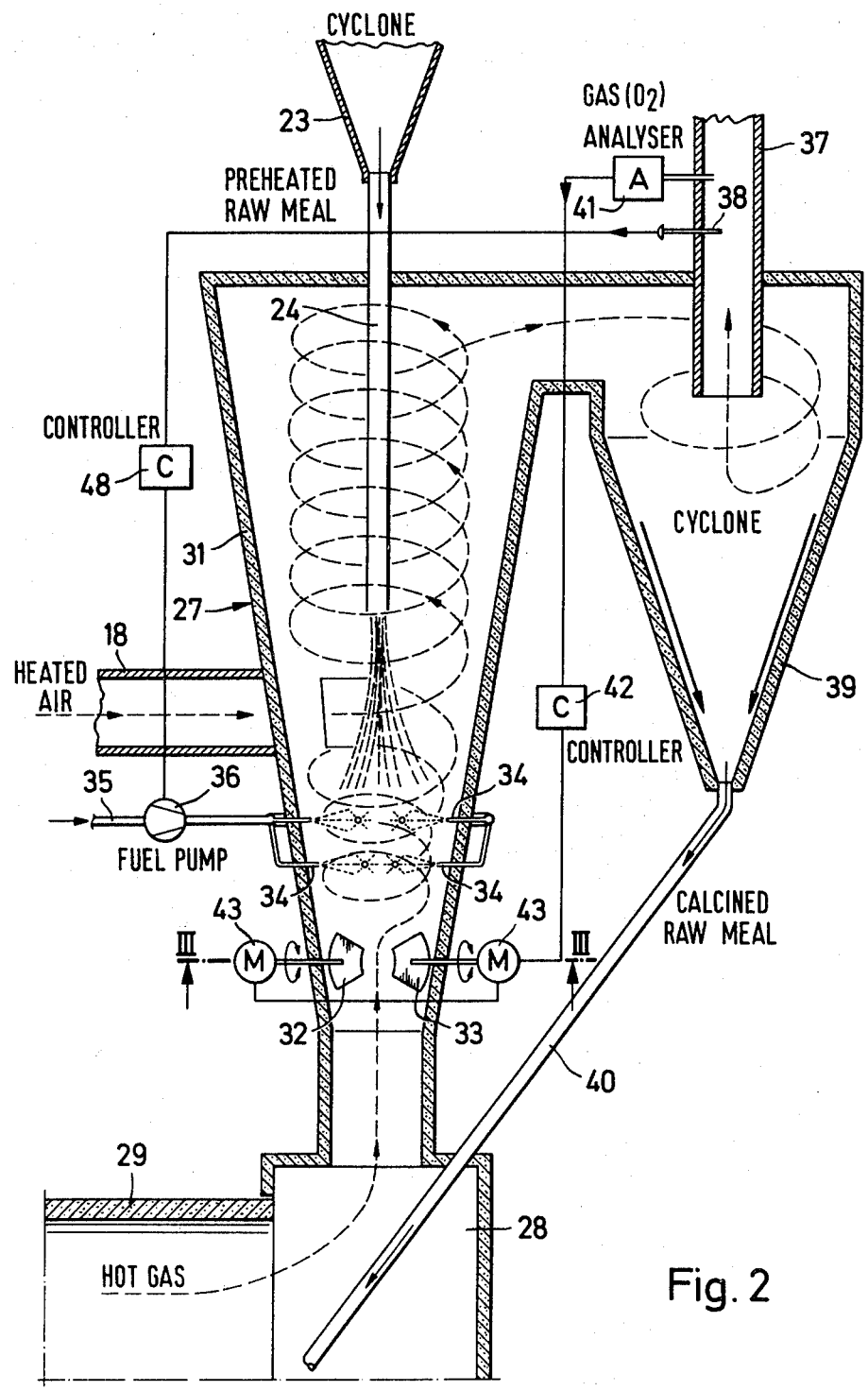
FIG. 2 is an enlarged diagrammatic view of a precalcinator according to the present invention.

FIG. 2 shows the precalcinator 27 of FIG. 1 in detail. It comprises a slightly conical upwardly diverging shaft 31 lined with refractory material and into which the furnace head 28 opens centrally from below and introduces the hot gas from the rotary kiln in an axial direction as represented by the arrows.

In the lower part of the precalcinator 27 there are provided adjustable guide blades 32 and 33 whose positions determine the quantity of furnace gas per unit time which enters the shaft 31 and, in addition, impart a twist or vortex to the furnace gas.

Above the blades 32 and 33 there are provided two planes of fuel injectors 34 which introduce the fuel radially of the axis of the shaft 31 and are connected via a manifold to the fuel line 35 and a pump 36. The injectors or nozzles 34 disperse the fuel in finely divided form within a narrow part of the shaft 31.

In a plane above the uppermost row of injectors 34, a conduit 18 opens tangentially into the shaft 31, the conduit 18 recovering heated air (cooler effluent gas) from the grate-type cooler 22. Only a single tangential opening is shown for the heated air although a number of such tangential openings can be provided in the aforementioned plane. In any event, the heated air is so introduced that it increases the twist imparted by the blades 32 and 33 to the furnace gas.

The preheated raw meal from cyclone 23 is introduced into the precalcinator 27 by tube 24. From the outlet of the tube 24 it will be drawn downwardly to the region of fuel injection by the downstream flow in the center of the vortex caused by rotation of gases.

The use of a shorter tube 24 permits the raw meal to enter into a free fall downwardly until it reaches the fuel-injection plane and there mixes with the fuel and the furnace gas, becoming uniformly suspended therein.

When the furnace gas, fuel and raw material mix together, they do not encounter the preheated air introduced by duct 18 from the cooler so that the latter serves as combustion air to effect a flameless oxidation in the rising vortex of the mixture. The liberated heat is then used directly for the deacidification reaction which occurs at about 820° to 850° C. without raising the gas temperature higher than about 900° C. This flameless combustion takes place immediately above the plane of the air feed from the duct 18.

To protect the system against overheating and to maintain the degree of precalcification as close as possible to a constant, the fuel quantity is controlled in response to the temperature of the gases at the outlet duct 37 of the system, e.g. via the temperature sensor 38, by control of the speed of pump 36 by the controller 48.

As has already been indicated, the gas which rises in the precalcinator 27 is carried away by the discharge stack 37 which communicates with a cyclone 39 removing the deacidified raw meal from the gas. The raw meal passes via a chute 40 into the inlet of the rotary kiln 29.

The duct 18 which supplies the heated air from the cooler to the calcinator 27 is relatively long and is, in the embodiment shown, longer than the rotary kiln 29. Because of this and the fact that the inner cross section of the duct is less than that of the rotary furnace 29, the resistance in duct 18 is greater than that in the rotary furnace 29 so that is is possible for less than the desired quantity of heated air to be drawn into the precalcinator.

As a consequence it has been found to be advantageous to throttle the flow of furnace gas into the precalcinator using the pivotal blades 32 and 33 previously mentioned.

The blades 32 and 33 are adjustable, as can be seen in detail from FIG. 3, and vary the throughout of the gas. The increased throttling results in a lower pressure in the precalcinator to permit more preheated air to be drawn in from duct 18. Advantageously, the throttling energy is transformed into the vortex movement of the gas which has been found to be important for the effective operation of this system.

At the outlet 37, an oxygen measuring device or analyzer 41 is provided which detects the oxygen content of the discharged gas and via the controller 42 sets the blades 32 and 33 via the servomotors 43 to increase or decrease the air intake of the precalcinator.

The manner in which the servomotors operate will be apparent from FIG. 3 as well. Each of the blades 32 and 33 is fixed to a shaft 44 or 45 journaled in a bore in the wall of the conical housing 31. At the outer end of each shaft 44, 45, a crank 46 or 47 is provided, the cranks reaching in opposite directions so that when the servomotor rotates the cranks in the same direction, the shafts are likewise rotated in the same sense although the blades are tilted in opposite senses. This ensures the desired vortex generation in the gas.

FIG. 3 shows the setting of the blades 32 and 33 for the greatest resistance to the incoming furnace gas. When the blades 32 and 33 are perpendicular to the plane of the paper in FIG. 3, naturally, at 90° to their illustrated positions (see FIG. 2) the resistance is the smallest.

Figure 4:
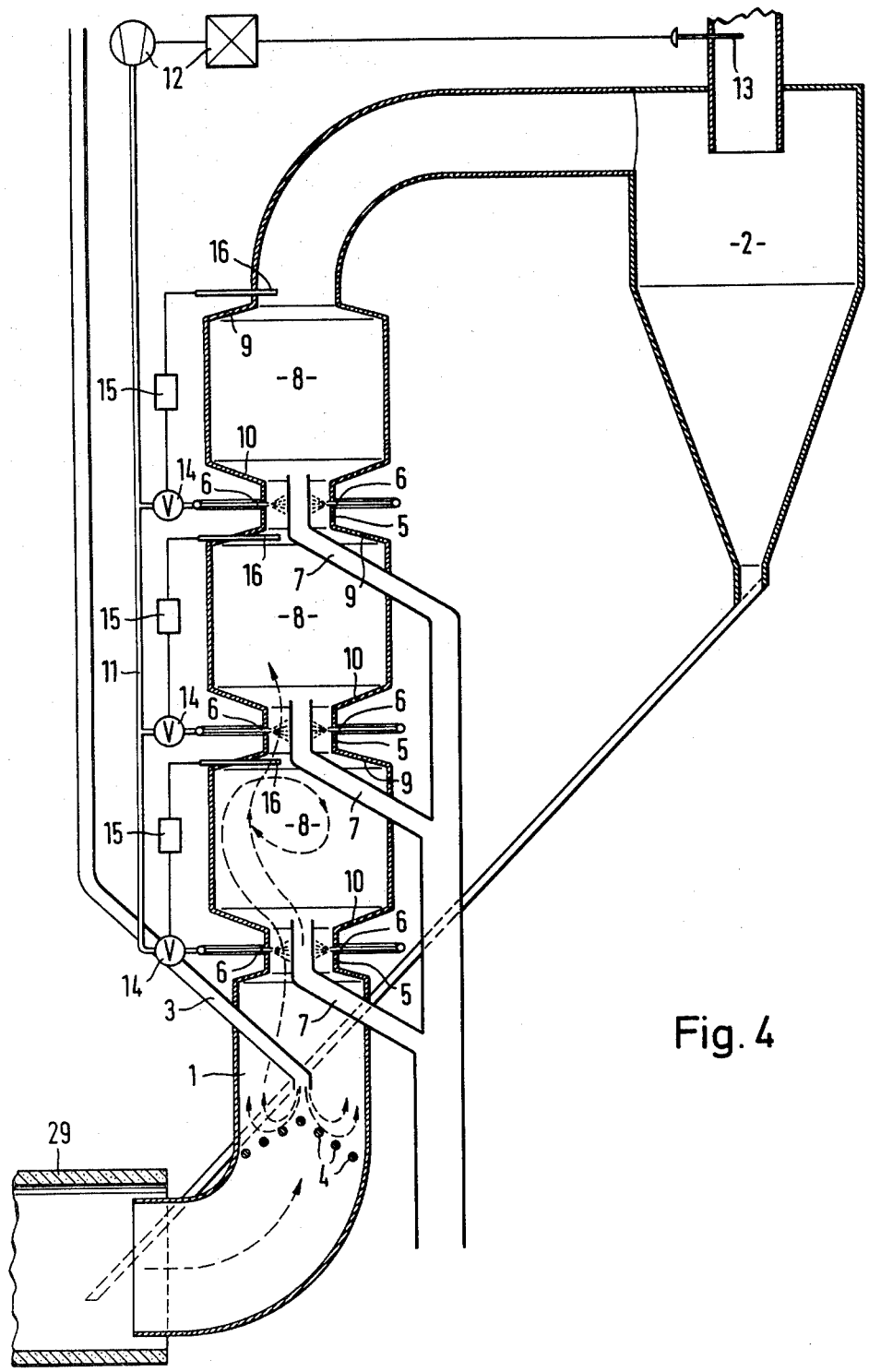
FIG. 4 shows another embodiment of the precalcinator.

Another embodiment of a precalcinator will be shown in FIG. 4. The powdered raw meal is delivered by a tube 3 to a bar grate 4 being arranged in an ascending tube 1 between the rotary kiln 29 and the precalcinator. The powdered raw meal stream impinges against the bar grate 4 and is dispersed. The free cross section of the bar grate 4 is so dimensioned that the velocity of the exhaust gas upwardly coming from the rotary kiln 29 therein exceeds 20 meters per second.

Above the mouth of the tube 3, the ascending tube 1 is so constricted that the gas velocity is increased from about 15 to 20 meters per second to a value in excess of 30 meters per second. In this circular constriction 5, fuel is introduced through a multiplicity of annular nozzles 6 into the turbulent powder-gas stream which is free from oxygen. Only thereafter is the combustion air admitted centrally from below through a pipe 7, which receives a preheated air from the cooler 22 through the tube 18 (not shown; see FIG. 1) and has its mouth in the constriction 5. The air is fed in stoichiometric quantity and causes a flameless combustion of the fuel which has been uniformly coated onto the particles of the raw meal.

Above the mouth of tube 7, the cross section of the precalcinator widens into a mixing chamber 8 which has, at its outlet side, a frustoconical convergence toward the next higher constriction 5 (frustoconical outlet 9).

As shown in FIG. 4, three such constrictions 5, three planar arrays of nozzles 6 discharging into the constrictions 5 and three tubes 7 for delivery of the preheated combustion air opening just above each constriction and three mixing chambers 8 with respective frustoconical outlets 9 are provided. At their inlet sides, the mixing chambers 8 are provided with frustoconical bottoms 10 whose apex angles are smaller than the apex angles of the frustoconical outlets 9.

In each of the mixing chambers 8 the fuel is oxidized by flameless combustion to consume all of the stoichiometric oxygen supply. The turbulence creates substantial temperature homogeneity throughout the mixing chambers 8. The fuel feed is effected under pressure by a pipe system 11 with the total quantity of fuel being regulated by a controller 12 in accordance with the temperature detected by a sensor 13 for the temperature at the outlet of a cyclone 2 which has the same task as the cyclone 39 according to FIG. 2. The quantity of fuel for each set of nozzles 6 is determined by respective valves 14, their controllers 15 and sensors 16 which measure the gas temperature at the outlet of each stage (mixing chambers 8).

SPECIFIC EXAMPLE

In the apparatus of FIGS. 1 and 2, 50% of the thermal energy is developed by the burner 19/20 of the rotary furnace 29 and 50% by the burners 34 of the precalcinator 27, corresponding to 475 Kcal/kg clinker at each location. The cooling air is introduced at 21 with a temperature of about 20° C. in a quantity of 2.2 m$^3$/kg of clinker (STP). The clinker recovered from the rotary furnace at a temperature of 1350° C. is thus cooled with an efficiency of 74% to 80° C. and is discharged at this temperature at 17.

Within the rotary furnace 29 a temperature of about 2000° C. is maintained, the thermal requirement being about 950 Kcal/kg of clinker. A portion of the air heated in the cooler 22 is introduced into the rotary kiln at a temperature of 840° C. while another portion of the cooler air [0.45 m$^3$/kg of clinker (STP)] is fed at a temperature of 475° C. via a duct 18 to the precalcinator 27. A third portion of the cooler air [1.2 m$^3$/kg of clinker (STP)] is fed at a temperature of 325° C. out of the cooler 22 for auxiliary heat recovery (not shown).

The air which is introduced into the rotary furnace 29 is heated to 1100° C. and is discharged from the head 28 into the precalcinator 27 and contacts the fuel which is injected at 34. A minor combustion may occur at this point which increases the temperature slightly to 1150° C. The heated raw meal then contacts the mixture such that the furnace gas, the fuel and the raw meal mix together to produce a suspension at a temperature of about 900° C. which is deacidified and meet the cooler air which is at a temperature of 475° C. in the precalcinator.

A flameless combustion is thus sustained at a temperature of about 950° C. At this temperature the deacidified raw meal is carried in a vortex into the cyclone 39 where it is separated from the gas and fed at a temperature of 850° C. via the chute 40 to the rotary furnace 29. The gaseous component separated in the cyclone 39 is fed to the cyclone 23 at a temperature of 870° C. and serves to preheat the raw meal in an amount of 1.4 m$^3$/kg of clinker (STP).

The preheated meal, at a temperature of 500° C. is introduced into the precalcinator at which deacidification begins at a temperature of about 820° to 850° C.

Naturally, instead of the two cyclone system of FIGS. 1 and 2, it is possible to operate with a greater number of stages, for example with four cyclones. In such an arrangement, the raw meal delivered by the duct 26 is already preheated, e.g. is not at a temperature of about 20° C. as is the case in FIGS. 1 and 2 but is already at a temperature of about 600° C., the preheating to those temperatures being effected in still further cyclones. The gas at 25 is fed to these additional cyclones for this further preheating in the same manner as has been described for the cyclones 23 and 39.

In such a four-stage process, the terminal requirement of the rotary furnace is only about 850 Kcal/kg of clinker. The raw meal is introduced into the precalcinator at a temperature of 740° C. while the gas leaving the cyclone 39 is at a temperature of 900° C. The gas discharged from the uppermost cyclone is not at a temperature of about 550° C. as is the case with a two-stage process but is at a temperature of about 360° C. for the four-stage system, thereby indicating greater efficiency.

I claim:

1. A method of firing sinterable powder having a carbonate component, comprising the steps of:
    (a) preheating said powder by suspension thereof in a hot gas;
    (b) precalcining the preheated powder of step (a) by:
        (b$_1$) forming a turbulent mixture of particles of the powder and said gas substantially in the absence of free oxygen with a substantially vertical axis,
        (b$_2$) spraying fuel laterally into said turbulent mixture thereby dispersing it optimally and depositing said fuel at least in part upon the particles of said powder,
        (b$_3$) while maintaining the turbulence of this mixture laterally adding a stoichiometric quantity of oxygen with respect to said fuel to effect a flameless oxidation of the fuel and heat the particles to a temperature sufficient for substantially complete decarbonatization thereof;
    (c) calcining the particles treated in step (b) in a rotary kiln to form clinker;
    (d) cooling the clinker formed in step (c) with an oxygen-containing gas thereby heating the oxygen-containing gas; and
    (e) feeding at least a portion of the oxygen-containing gas heated in step (d) to step (b$_3$) to supply the oxygen therefor.

2. The method defined in claim 1, further comprising a step of controlling the underpressure in the precalciner by twisting the gases, which affects the the quantity of sucked tertiary air from the cooler, in response to the oxygen content of the waste gas at the end of step (b$_3$).

3. The method defined in claim 1, further comprising a step of controlling the feed of fuel in step (b) in response to the temperature of the mixture at the end of step (b).

4. The method defined in claim 1, claim 2 or claim 3 wherein, in step (b), the hot gas is given a turbulent swirl about a vertical axis by the feed of the heated oxygen-containing gas, the powder is fed centrally through this swirl to a location beneath the plane of introduction of the oxygen-containing gas where it mixes with the turbulent hot gas, the fuel is injected in the region of this location, and the hot gas is fed axially upwardly to this region and given a swirl about said axis independent of the swirl imparted by said oxygen-containing gas.

5. The method defined in claim 1, claim 2 or claim 3 wherein, in step (b), the hot gas is fed upwardly through an axial lower gas inlet to a conically upwardly widening housing having a vertical axis and is given a swirl about said axis by a plurality of guide vanes rotatably about respective axes, transverse to the vertical axis, the heated oxygen-containing gas is introduced into said housing at a location spaced above said guide from at least one tangential inlet imparting a swirl about said vertical axis to the mixture in said housing, said fuel is injected into said housing at a location between said vanes and said inlet, and the mixture passes upwardly from said housing to a cyclone in which particles are separated from gas.

* * * * *